US008843451B2

United States Patent
Raichstein et al.

(10) Patent No.: US 8,843,451 B2
(45) Date of Patent: *Sep. 23, 2014

(54) BLOCK LEVEL BACKUP AND RESTORE

(75) Inventors: Eran Raichstein, Yokenam Ilit (IL); Michael Sternberg, Haifa (IL); David G. Van Hise, Tucson, AZ (US); Uri Wolloch, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/243,789

(22) Filed: Sep. 23, 2011

(65) Prior Publication Data

US 2013/0080390 A1    Mar. 28, 2013

(51) Int. Cl.
  *G06F 7/00* (2006.01)
  *G06F 11/14* (2006.01)
  *G06F 17/30* (2006.01)

(52) U.S. Cl.
  CPC ............. *G06F 7/00* (2013.01); *G06F 11/1451* (2013.01); *G06F 17/30135* (2013.01); *G06F 17/30067* (2013.01); *G06F 11/1448* (2013.01); *G06F 11/1469* (2013.01); *G06F 11/1458* (2013.01)
  USPC ........................................................ 707/653

(58) Field of Classification Search
  CPC ............................................... G06F 17/30135
  USPC .......................................................... 707/653
  See application file for complete search history.

(56) References Cited

U.S. PATENT DOCUMENTS

| 6,785,786 B1 * | 8/2004 | Gold et al. ..................... 711/162 |
| 2006/0184554 A1 * | 8/2006 | Albert et al. ................... 707/101 |
| 2008/0275911 A1 * | 11/2008 | Sandorfi et al. ............ 707/103 R |
| 2009/0307286 A1 * | 12/2009 | Laffin ........................... 707/204 |
| 2010/0115011 A1 | 5/2010 | Callahan et al. |

FOREIGN PATENT DOCUMENTS

WO    2008136563    11/2008

OTHER PUBLICATIONS

U.S. Appl. No. 12/972,291, filed Dec. 17, 2010, entitled "Restoring a Restore Set of Files From Backup Objects Stored in Sequential Backup Devices", invented by Matthew J. Anglin, David M. Cannon, Avishai H. Hochberg, David G. Van Hise, Mark L. Yakushev, 34 pages.

(Continued)

*Primary Examiner* — Apu Mofiz
*Assistant Examiner* — Ajith Jacob
(74) *Attorney, Agent, or Firm* — Janaki K. Davda; Konrad, Raynes, Davda and Victor LLP

(57) ABSTRACT

For block level backup, a full image level backup is created of a file system from production storage at a production server to random access storage at a backup server. A mounted image is created from the full image that exposes a block level representation of the file system of the production server for read operations in a file level format. File enumeration is performed on the mounted image for files. Block level read operations are monitored while the files are being enumerated. During monitoring, blocks that are read for the read operations are marked as meta-data blocks. Blocks that are not marked as meta-data blocks are identified as data blocks. The data blocks are migrated to sequential storage, while leaving the meta-data blocks on the random access storage, wherein the data blocks form a backup image.

12 Claims, 6 Drawing Sheets

(56) References Cited

OTHER PUBLICATIONS

"Depth-First Search", Wikipedia, (online), 2011, (Retrieved on Jul. 18, 2011), retrieved from the Internet at <URL:http://en.wikipedia.org/wiki/Depth-first_search>, 1 pg.

U.S. Appl. No. 13/480,305, filed May 24, 2012, entitled "Block Level Backup and Restore", invented by Eran Raichstein et al., pp. 1-29.

Preliminary Amendment for U.S. Appl. No. 13/480,305, filed May 24, 2012, entitled "Block Level Backup and Restore", invented by Eran Raichstein et al., pp. 1-6.

Office Action dated Oct. 2, 2012, pp. 1-19, for U.S. Appl. No. 13/480,305, filed May 24, 2012 by inventors Eran Raichstein et al. (37.265C1).

Response to Office Action dated Jan. 2, 2013, pp. 1-9, for U.S. Appl. No. 13/480,305, filed May 24, 2012, by inventors Eran Raichstein et al. (37.265C1).

Final Office Action, dated Mar. 21, 2013, for U.S. Appl. No. 13/480,305, filed May 24, 2012, entitled " Block Level Backup and Restore" by E. Raichstein et al., pp. 1-15.

Response to Final Office Action, dated Jun. 19, 2013, for U.S. Appl. No. 13/480,305, filed May 24, 2012, entitled " Block Level Backup and Restore" by E. Raichstein et al., pp. 1-8.

Office Action, dated Sep. 16, 2013, for U.S. Appl. No. 13/480,305, filed May 24, 20124, entitled, "Block Level Backup and Restore", invented by Eran Raichstein et al., pp. 1-15.

Response to Office Action, dated Jan. 16, 2013, for U.S. Appl. No. 13/480,305, filed May 24, 2012, entitled, "Block Level Backup and Restore", invented by Eran Raichstein et al., pp. 1-7.

Notice of Allowance, dated Apr. 7, 2014, for U.S. Appl. No. 13/480,305, filed May 24, 2012, enitled, "Block Level Backup and Restore", invented by Eran Raichstein et al., Total 13 pgs.

* cited by examiner

BLOCK LEVEL BACKUP AND RESTORE

BACKGROUND

Embodiments of the invention relate to block level backup and restore. In particular, embodiments relate to file system agnostic image backup on sequential devices to facilitate efficient file level retrieval.

Production servers store production data in production storage. Periodically, the production data is copied to backup storage at a backup server. The production data may be copied as an image. The terms "image", "block level backup", and "snapshot" are used to represent technology that refers to the process of protecting live production servers using software or hardware, without interfering with the production servers. The technology captures a point-in-time representation of the production data from a production server in a lower level of the storage stack and represents the production data in storage blocks that are agnostic to upper storage layers (e.g., volume managers, file systems, etc.).

Some production servers perform file level backups of images from production servers to a backup server. Some of the production servers may have millions of files, which cause the creation of large indices in backup processes, while other production servers include applications (e.g., database applications) that physically use large files, which causes backup processes to backup those files frequently.

In addition, virtualization vendors have introduced Application Programming Interfaces (APIs) that provide capabilities to perform off-host block level incremental backups. Such off-host processes are becoming popular, and some backup vendors have created products to interact with those APIs (e.g., to allow off-host block level backups of virtual machines) and deprecate the usage of traditional file level backup in guest production servers.

With the growing popularity of hardware snapshots, and the support of incremental capacities in some hardware storage devices, it also becomes more convenient to backup production data using hardware snapshots and off loading the production data into software based solutions in block representation, thus, creating block level images in contrast to legacy file level backups.

While storage devices are becoming less expensive, there is a price gap between different backup storage technologies, such as random access devices (e.g., disk devices) and sequential devices (e.g., tape drives). With growing storage requirements, customers are using data reduction technologies to production data (i.e., primary data) and backup data, and information is stored on sequential devices due to price, especially when the amount of time that the backup data needs to be kept on those devices, and the size of the backup data, is large.

When performing file level recovery from images, backup data is typically retrieved from the image in several steps. First there is a need to enumerate the list of files (e.g., with a Dir command). Second, a specific file or files to be retrieved are selected. Third, the data blocks of the specific file or files that need recovery are retrieved. While the data blocks of the files themselves are typically located sequentially (because of the locality of reference nature of modern file systems), the meta-data blocks to enumerate the files, in most cases, are not kept in sequential order and are located on different areas of the volume holding the files.

SUMMARY

Provided is a method, computer program product, and system for block level backup. A full image level backup is created of a file system from production storage at a production server to random access storage at a backup server. A mounted image is created from the full image that exposes a block level representation of the file system of the production server for accesses for read operations in a file level format. File enumeration is performed on the mounted image for files. Block level read operations are monitored while the files are being enumerated. During monitoring, blocks that are read for the read operations are marked as meta-data blocks. Blocks that are not marked as meta-data blocks are identified as data blocks. The data blocks are migrated to sequential storage, while leaving the meta-data blocks on the random access storage, wherein the data blocks form a backup image.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments of the invention store meta-data blocks on random access storage, while storing associated data blocks on sequential storage. Storing the meta-data blocks on the random access storage leads to efficient restore of the data blocks on the sequential storage, taking into account that analysis on the meta-data block may create more efficient data blocks reads). For example, embodiments may store backed up meta-data blocks on disk and store backed up image data blocks on tape. Embodiments lead to a more efficient reading process because embodiments prepare and read the blocks in efficient order and browse through the files to find the right file to restore from the disk, and this browsing is not influenced by tape performance, which depends on tape characteristics.

Figure 1:
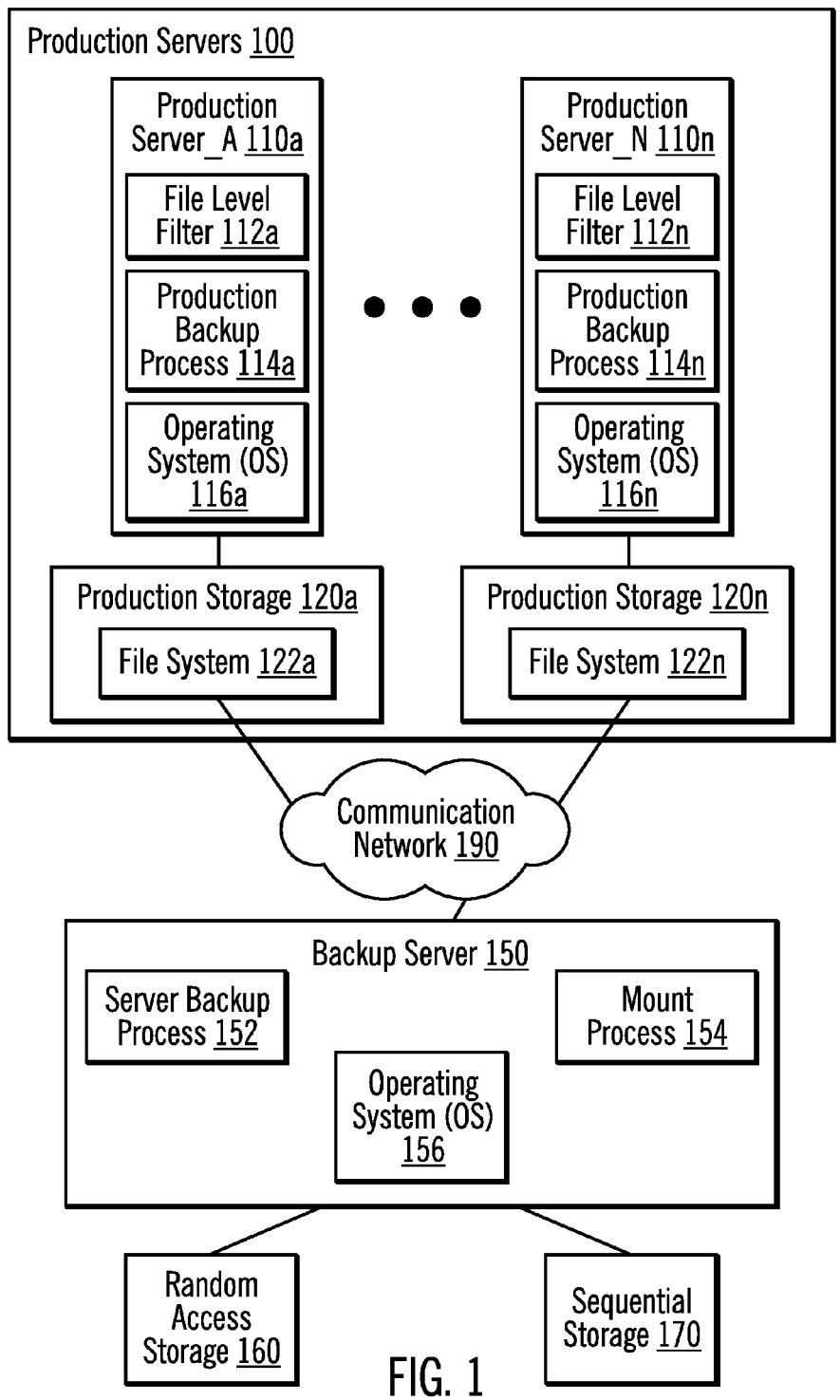
FIG. 1 illustrates a network backup environment in accordance with certain embodiments.

FIG. 1 illustrates a network backup environment in accordance with certain embodiments. The network backup environment includes one or more production servers 100 that communicate with a backup server 150 over a communication network 190. There may be one or more production servers 110a ... 110n. Although one backup server 150 is illustrated, there may be additional backup servers in alternative embodiments.

Each production server 110a ... 110n includes a file level filter 112a ... 112n, a production backup process 114a ... 114n, and an Operating System (OS) 116a ... 116n. Each production server 110a ... 110n is coupled to production storage 120a ... 120n. Each production server 110a ... 110n has a file system 122a ... 122n in its corresponding production storage 120a ... 120n. In certain embodiments, the production storage comprises one or more production storage devices.

The backup server 150 includes a server backup process 152, a mount process 154 (also referred to as a block level exposure process), and an Operating System (OS) 156. The backup server 150 is coupled to random access storage 160 (e.g., disk media) and sequential storage 170 (e.g., tape media). In certain embodiments, the random access storage 160 comprises one or more random access storage devices. In certain embodiments, the sequential storage 170 comprises one or more sequential storage devices.

In the network backup environment, the production servers 110a ... 110 backup the data in backup objects stored in the production storage 120a ... 120n to the backup server 150. The backup server 150 maintains a database of backup objects providing information on stored backup objects. The production servers 110a ... 110n may restore files from the backup objects maintained by the backup server 150.

The backup objects for a volume include a full volume backup object as of an initial point-in-time and delta backups that capture changes to the volume as of the initial point-in-time at different points-in-time. The delta backups may comprise an incremental backup or differential backup. An "incremental backup" at a point-in-time comprises a backup object having files that have changed between the point-in-time of the last taken incremental backup or full volume backup, whichever is more recent, and the point-in-time of the incremental backup. A "differential backup" comprises a backup taken of a volume as of a point-in-time of the last full volume backup, so a differential backup set has all files that have changed between the point-in-time of the differential backup and the last full volume backup.

In order to achieve the block level storage separation between meta-data blocks and data blocks, the data is captured from production storage 120a ... 120n into random access storage 160 using block level technology, with the ability to monitor the changes in file information (i.e., list of files that are changed on top of the blocks that are captured). Also, the mount process 154 is a block level exposure utility that exposes a block level representation of the captured block level image. Such an exposed block level image represents a file system 122a ... 122n of a particular production server 110a ... 110n for accesses for read operations by the Operating System (OS) 116a ... 116n at the production server 110a ... 110n. The mount process 154 monitors read operations against the backed up image and reports the blocks that are read. Also, the server backup process 152 is a migration process that moves selectable blocks from the random access storage 160 into the sequential storage 170.

To support block level incremental backups and efficient file level recovery from block level backup images, a file level filter 112a ... 112n is installed on each production server 110a ... 110n. The file level filter 112a ... 112n captures changes at the file system level in the file system 122a ... 122n. The file level filter 112a ... 112n finds the files that have changed between incremental snapshots. The file level filter 112a ... 112n reports the list of changed files to the mount process 154, and the mount process 154 performs an enumeration process against the changed files on a mounted volume to make sure that the underlined blocks are marked as meta-data blocks, and, thus, are not moved from random access storage 160 to sequential storage 170. In virtual environments, there may be remote insertion of in-guest scripts to guest production servers 110a ... 110n. In cases in which a block includes both meta-data and data, the block is treated as a meta-data block.

Figure 2:
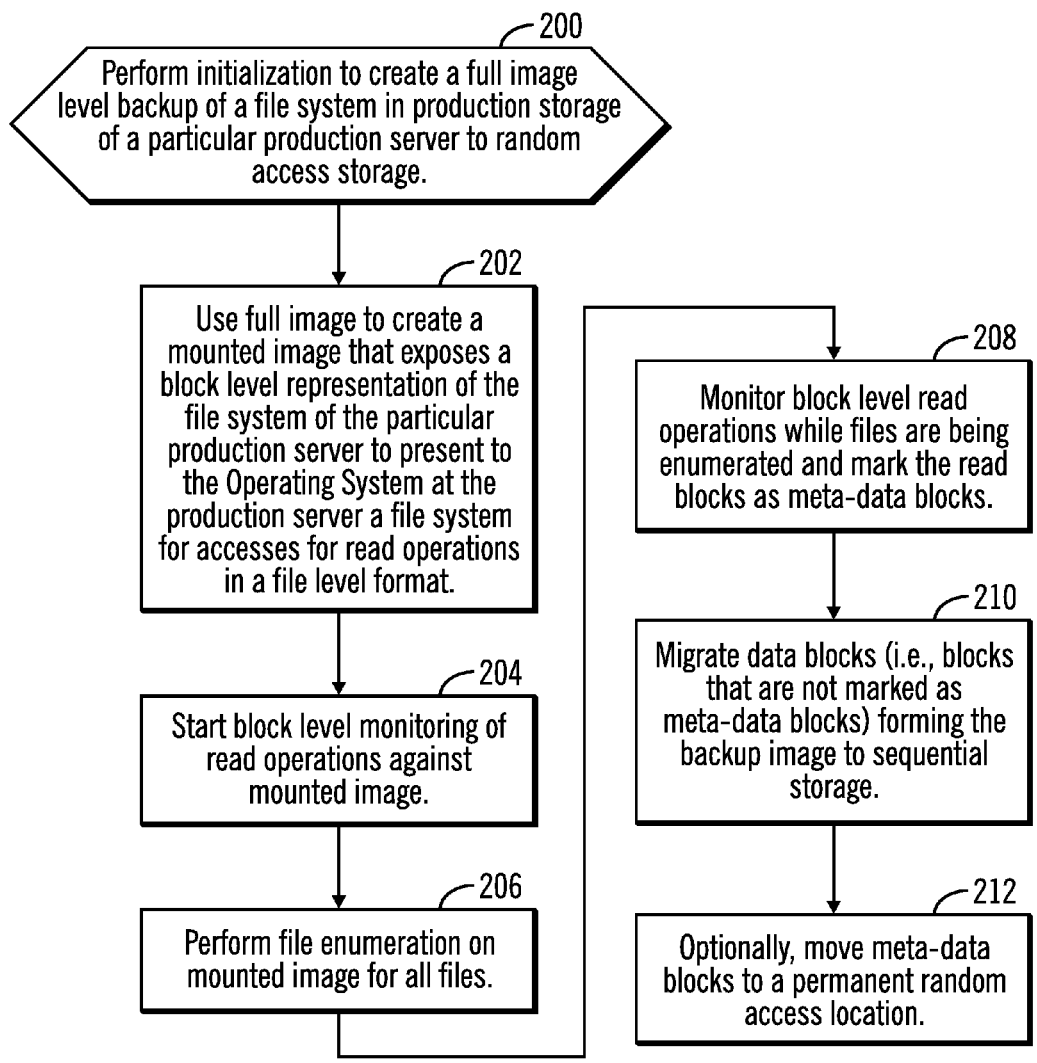
FIG. 2 illustrates, in a flow diagram, logic performed for initialization in accordance with certain embodiments.

FIG. 2 illustrates, in a flow diagram, logic performed for initialization in accordance with certain embodiments. Control begins at block 200 with a production backup process 114a ... 114n working with the server backup process 152 performing initialization to create a full image level backup of a file system 122a ... 122n in production storage 120a ... 120n of a particular production server 110a ... 110n to random access storage 160. In block 202, the mount process 154 uses the full image to create a mounted (i.e., exposed) image that exposes a block level representation of the file system 122a ... 122n of the particular production server 110a ... 110n to present to the OS 116a ... 116n at the production server 110a ... 110n a file system for accesses for read operations in a file level format. In certain alternative embodiments, the mounted image may be used for accesses for read/write operations. In embodiments, the mount process 154 is specific per OS/file system or is an OS/file system agnostic block level technology. The file system 122a ... 122n exposed by the mount process 154 is exposed over the communication network 190 to the production server 110a ... 110n (i.e., over an Internet Small Computer System Interface (iSCSI) network), that will allow the specific production server 110a ... 110n to extract data using the file system 122a ... 122n of that production server 110. Thus, the backup server 150 does not need to know the file systems 122a ... 122n of the production servers 110a ... 110n.

In block 204, the mount process 154 starts block level monitoring of read operations against the mounted image.

In block 206, the mount process 154 performs file enumeration on the mounted image for all files. In certain embodiments, the mount process 154 performs any known search in a tree technique (e.g., a Breadth-first Search (BFS) or Depth-First Search (DFS)) on the file level tree. During enumeration, the mount process 154 reads the meta-data blocks (but not the data blocks). In certain embodiments, the mount process performs a "DIR /S" command in a Windows® OS (Windows is a are registered trademark of Microsoft Corporation in the United States and other countries.)

In block 208, the mount process 154 monitors the block level read operations while the files are being enumerated and marks the read blocks as meta-data blocks. The blocks that are not marked are data blocks. In particular, the read operations reference meta-data blocks, so the blocks that are read are identified as meta-data blocks. That is, during monitoring, the mount process 154 marks blocks that are read for the read operations as meta-data blocks, and the remaining blocks that are not marked are identified as data blocks.

In block 210, once the enumeration is complete, the server backup process 152 migrates the data blocks (i.e., the blocks that are not marked as meta-data blocks) forming the backup image to sequential storage 170. In certain embodiments, the meta-data blocks remain in the random access storage 160. In block 212, optionally, the meta-data blocks are moved to a permanent random access location from the random access storage 160 to the sequential storage 170 in one chunk. In certain embodiments, the data blocks that are on random access storage 160 may be migrated as one batch to the sequential storage 170. In certain embodiments, the data blocks that are on random access storage 160 may be left on random access storage 160, and, then, for a restore operation, they do not need to be retrieved. In various embodiments, a batch may be a full image, an incremental image, a differential image or a generation image (i.e., full image+associated set of incremental or differential images) or any combination of such.

Figure 3:
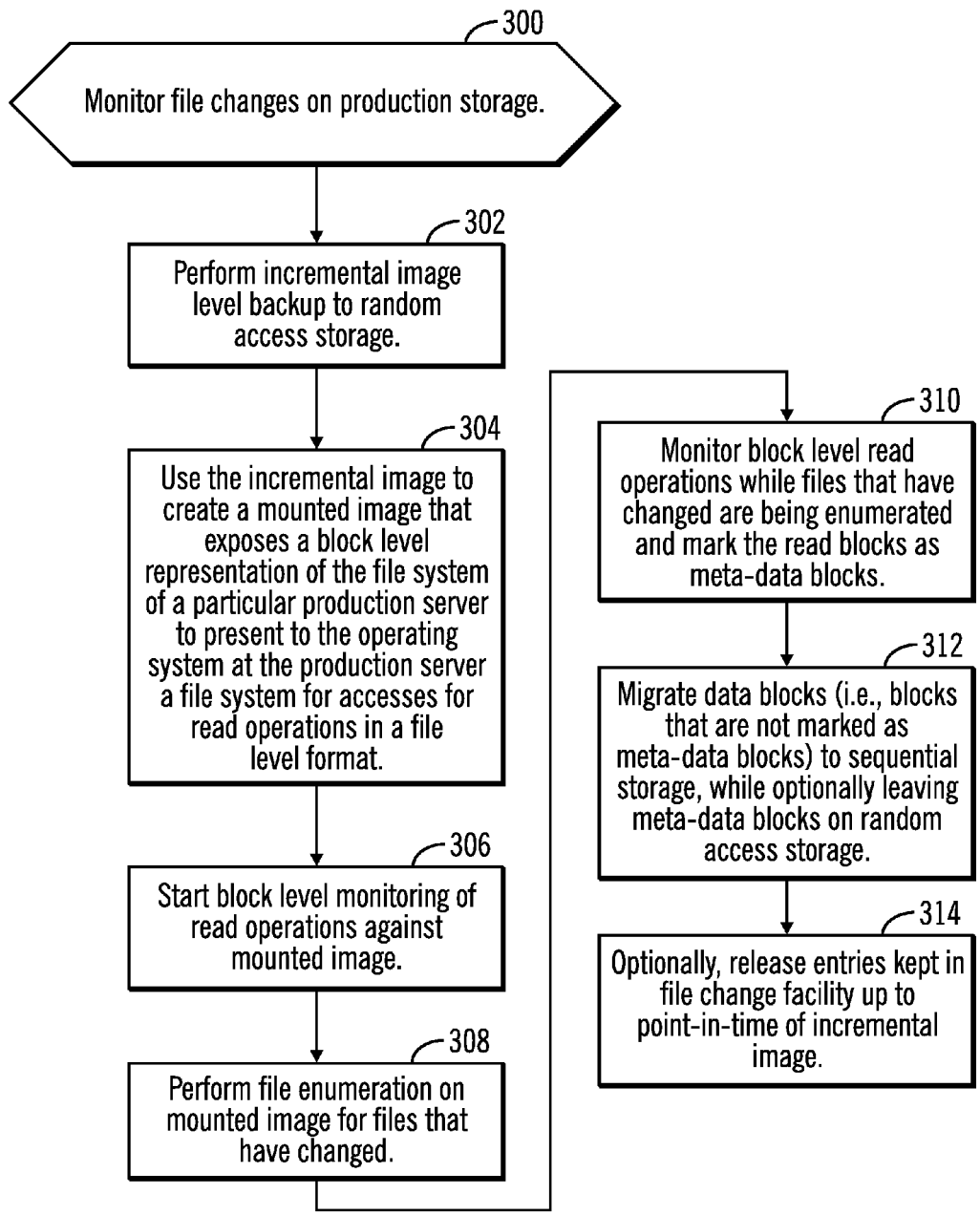
FIG. 3 illustrates, in a flow diagram, logic performed for steady state in accordance with certain embodiments.

FIG. 3 illustrates, in a flow diagram, logic performed for steady state in accordance with certain embodiments. Control begins at block 300 with the file level filter 112a . . . 112n monitoring file changes on the production storage 120a . . . 120n. In block 302, the production backup process 114a . . . 114n works with the server backup process 152 to perform an incremental image level backup to the random access storage 160.

In block 304, the mount process 154 uses the incremental image to create a mounted (i.e., exposed) image that exposes a block level representation of the file system of a particular production server to present to the OS at the production server a file system that can be accessed for read or read operations in a file level format. In certain alternative embodiments, the mounted image may be used for accesses for read/write operations.

In block 306, the mount process 154 starts block level monitoring of read operations against the mounted image.

In block 308, the mount process 154 performs file enumeration on the mounted image for files that have changed (as reported by the file level filter 112a . . . 112n for incremental changes). In certain embodiments, the file level filter 112a . . . 112n provides the mount process 154 with a list of files that were changed. In certain alternative embodiments, other technology may be used to find the list of changed filed (e.g., modified date, archive bit, etc.). The mount process 154 performs reads against sub folders of the files up to the root folder. The mount process 154 reads the relevant meta-data blocks (but not the data blocks).

In block 310, the mount process 154 monitors the block level read operations while the files that have changed are being enumerated and marks the read blocks as meta-data blocks.

In block 312, the server backup process 152 migrates the data blocks (i.e., the blocks that are not marked as meta-data blocks) to sequential storage 170, while optionally leaving the meta-data blocks in random access storage 160. That is, in certain embodiments, the meta-data blocks remain in the random access storage 160, and, in certain alternative embodiments, the meta-data blocks are moved to a permanent random access location from the random access storage 160 to the sequential storage 170 in one chunk. In certain embodiments, the data blocks that are on random access storage 160 may be migrated as one batch to the sequential storage 170. In certain embodiments, the data blocks that are on random access storage 160 may be left on random access storage 160, and, then, for restore they do not need to be retrieved. In various embodiments, a batch may be a full image, an incremental image, a differential image or a generation image (i.e., full image+associated set of incremental or differential images) or any combination of such.

In block 314, optionally, the file level filter 112a . . . 112n releases entries kept in a file change facility up to the point-in-time of the incremental image.

Figure 4:
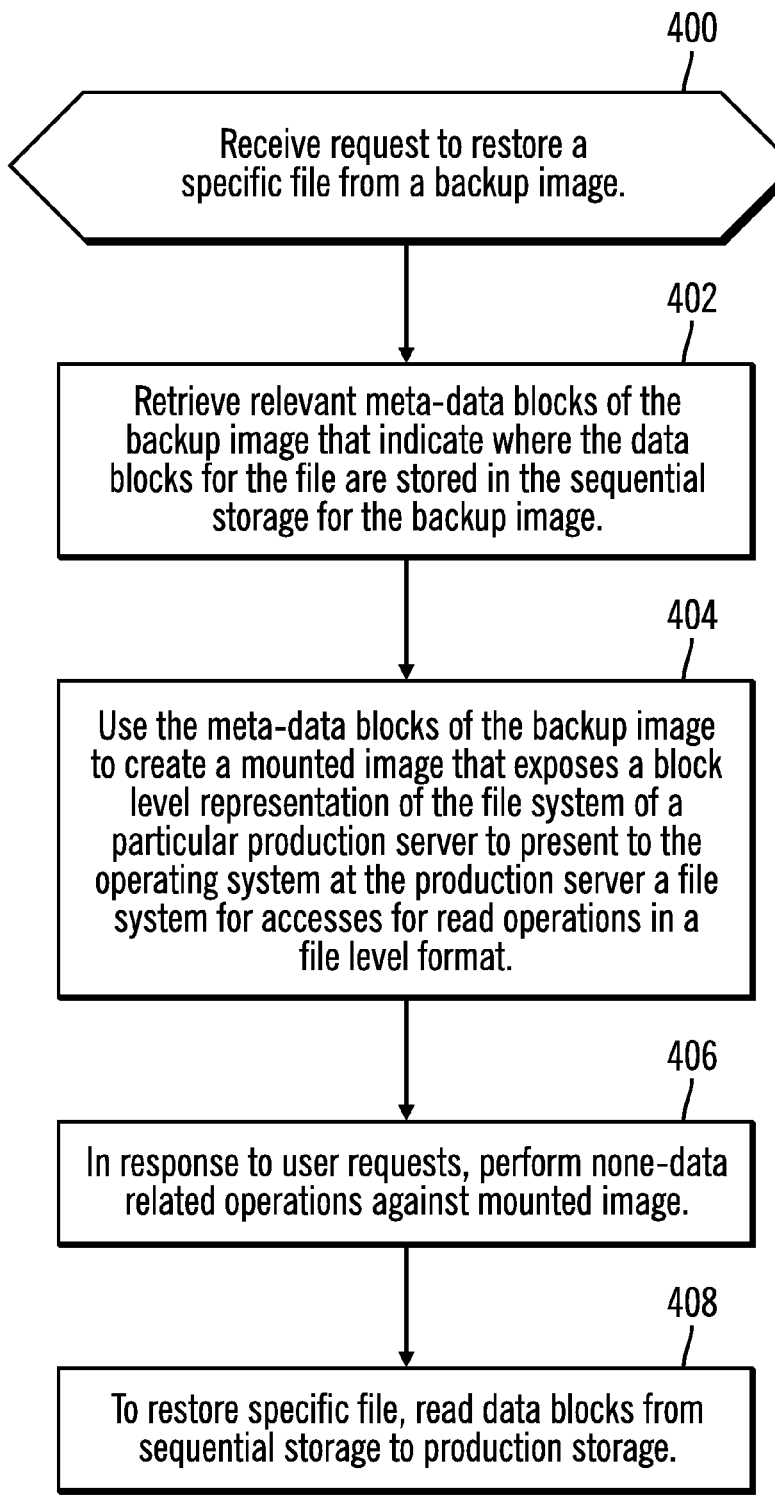
FIG. 4 illustrates, in a flow diagram, logic performed for file level restore in accordance with certain embodiments.

FIG. 4 illustrates, in a flow diagram, logic performed for file level restore in accordance with certain embodiments. Control begins at block 400 with the server backup process 152 receiving a request to restore a specific file from a backup image. In block 402, the server backup process 152 retrieves relevant meta-data blocks of the backup image that indicate where the data blocks for the file are stored in the sequential storage 170 for the backup image. In certain embodiments, the meta-data blocks are read from the random access storage 160. In certain alternative embodiments, the meta-data blocks may have been moved to sequential storage 170 as one chunk (in block 212 of FIG. 2), and, then, the meta-data blocks are read from the sequential storage 170 to the random access storage 160. This retrieval is an efficient process since the amount of meta-data blocks in a file system is relatively low, and the retrieval reads meta-data blocks in a sequential manner from the sequential storage 170.

In block, 404, in response to the meta-data blocks being stored in the random access storage 160, while the data blocks are stored on the sequential storage 170, the mount process 154 uses the meta-data blocks of the backed up image to create a mounted (i.e., exposed) image that exposes a block level representation of the file system 122a . . . 122n of the particular production server 110a . . . 110n to present to the OS 116a . . . 116n at the production server 110a . . . 110n a file system for accesses for read operations in a file level format. In certain alternative embodiments, the mounted image may be used for accesses for read/write operations.

At this point, the sequential storage 170 is not accessed (except to retrieve meta-data blocks stored in the sequential storage 170 as a chunk with a single command before the restore process).

In block 406, in response to user requests, any none-data related operations against the mounted image are performed (with data blocks being read from the random access storage 160). Examples of non-data related operations include explore, search or enumeration of files from the mounted image by accessing the meta-data blocks stored on random access storage 160. In block 408, to restore the specific file, the server backup process 152 reads data blocks from the sequential storage 170 directly to the production storage 120a . . . 120n random access storage 160.

In certain embodiments, the processing of FIG. 4 restores multiple files.

In certain embodiments, assuming that data blocks in legacy file systems are kept in sequential order, the read process is sequential. In certain embodiments, there may be a read a head mechanism to enhance read performance from sequential storage 170.

Figure 5:
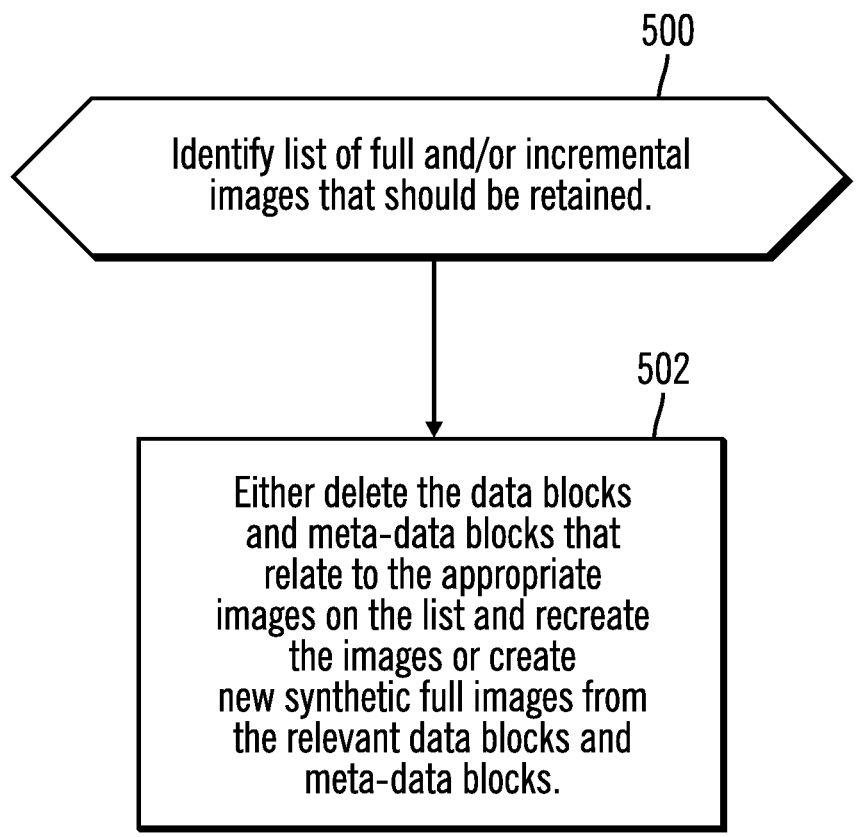
FIG. 5 illustrates, in a flow diagram, logic performed for expiration and retention in accordance with certain embodiments.

FIG. 5 illustrates, in a flow diagram, logic performed for expiration and retention in accordance with certain embodiments. Control begins at block 500 with the server backup process 152 identifying a list of full and/or incremental images that should be retained. In certain embodiments, a user (e.g., a system administrator) indicates, when the full or incremental image is created, how long that full or incremental image is to be retained. The server backup process 152 uses this information to identify the images. In certain embodiments, the files are identified on a scheduled basis or upon occurrence of an event.

In block 502, the either deletes the data blocks and meta-data blocks that relate to the appropriate images on the list and re-creates these images or creates new synthetic full images from the relevant data blocks and meta-data blocks. In certain embodiments, the server backup process 152 automatically knows to re-create these deleted images. In certain embodiments, the server backup process 152 creates new synthetic full images from the relevant data blocks and meta-data blocks. The determination of whether to re-create the deleted images or create new synthetic full images depends on the server backup process 152 image management characteristics (e.g., this is a constant operation, per type of environment we use). When creating a synthetic full image, the backup server process 152 may parse all meta-data blocks, reconstruct the new syntactic full meta-data blocks first, and, and as a secondary stage, perform gathering of the data blocks based on the order of the data blocks on the sequential storage 170 (to leverage the locality of reference in the sequential storage 170).

Unlike the agnostic system described herein, other technologies require specific knowledge of the file system and other Operating System (OS) specific storage layers and are sensitive to changes in storage layers, such as new Operating Systems, new file systems etc. Also some of the upper level layers may be proprietary, and, thus, the information is not publicly available. Such procedures may not fit solutions that aim to support a variety of environments.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be coupled to or connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Figure 6:
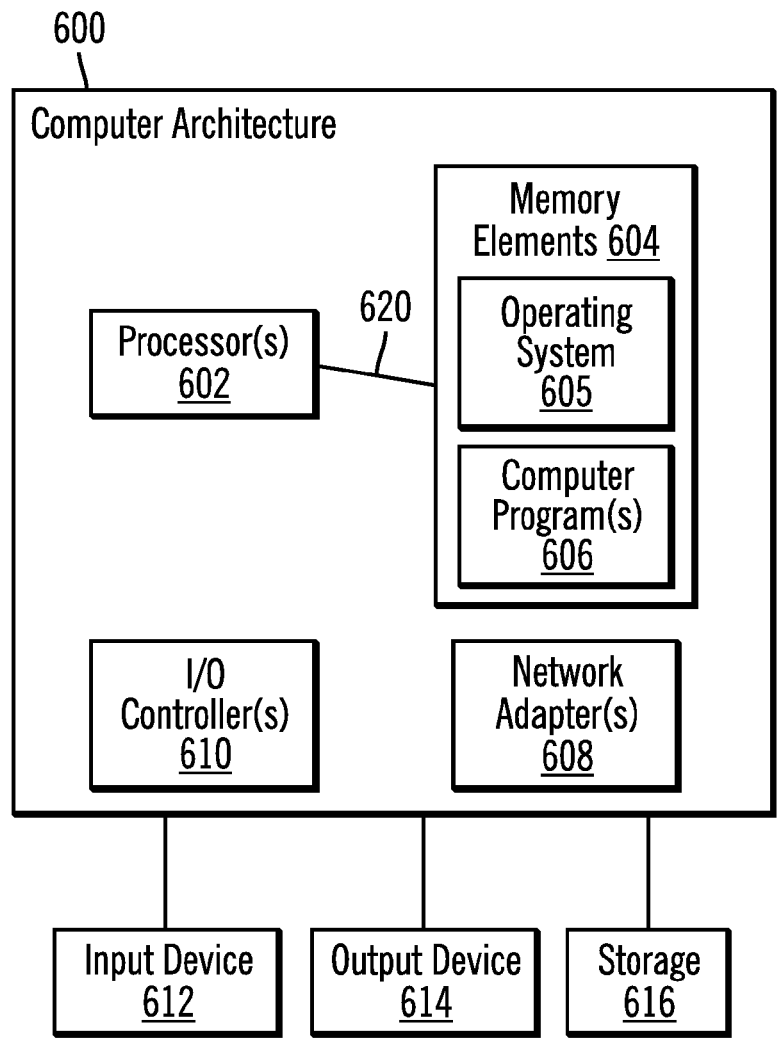
FIG. 6 illustrates, in a block diagram, a computer architecture that may be used in accordance with certain embodiments.

FIG. 6 illustrates a computer architecture 600 that may be used in accordance with certain embodiments. Production servers 110a . . . 110n and/or backup server 150 may implement computer architecture 600. The computer architecture 600 is suitable for storing and/or executing program code and includes at least one processor 602 coupled directly or indirectly to memory elements 604 through a system bus 620. The memory elements 604 may include local memory employed during actual execution of the program code, bulk storage, and cache memories which provide temporary storage of at least some program code in order to reduce the number of times code must be retrieved from bulk storage during execution. The memory elements 604 include an operating system 605 and one or more computer programs 606.

Input/Output (I/O) devices 612, 614 (including but not limited to keyboards, displays, pointing devices, etc.) may be coupled to the system either directly or through intervening I/O controllers 610.

Network adapters 608 may also be coupled to the system to enable the data processing system to become coupled to other data processing systems or remote printers or storage devices through intervening private or public networks. Modems, cable modem and Ethernet cards are just a few of the currently available types of network adapters 608.

The computer architecture 600 may be coupled to storage 616 (e.g., a non-volatile storage area, such as magnetic disk drives, optical disk drives, a tape drive, etc.). The storage 616 may comprise an internal storage device or an attached or network accessible storage. Computer programs 606 in storage 616 may be loaded into the memory elements 604 and executed by a processor 602 in a manner known in the art.

The computer architecture 600 may include fewer components than illustrated, additional components not illustrated herein, or some combination of the components illustrated and additional components. The computer architecture 600 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed.

Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A computer program product for block level backup, the computer program product comprising:
   a non-transitory computer readable storage medium having computer readable program code embodied therewith, wherein the computer readable program code, when executed by a processor of a backup server, is configured to perform:
   while performing file enumeration on a mounted image created from a full image that exposes a block level representation of a file system for files for access by an operating system of a production server, marking blocks for read operations that reference meta-data blocks as the meta-data blocks, wherein the blocks that are not marked as the meta-data blocks are data blocks;
   in response to the file enumeration completing, migrating the data blocks to sequential storage, while leaving the meta-data blocks on random access storage, wherein the data blocks form a backup image; and
   in response to receiving a request to restore a file from the backup image for the production server,
   retrieving relevant meta-data blocks from the random access storage that indicate where the data blocks for the file are stored in the sequential storage;
   creating a new, mounted image from the relevant meta-data blocks that exposes a block level representation of the file system for access by the operating system;
   performing non-data related operations against the new, mounted image; and
   restoring the file by reading the data blocks for that file from the sequential storage to production storage at the production server.

2. The computer program product of claim 1, wherein the computer readable program code, when executed by the processor of the backup server, is configured to perform:
   monitoring file changes on the production storage; performing an incremental image level backup to the random access storage;
   creating a new, mounted image from the incremental image that exposes a block level representation of the file system for accesses of the read operations in the file level format;

performing file enumeration on the new, mounted image for files that have changed;

monitoring block level read operations while the files that have changed are being enumerated;

during monitoring, marking blocks that are read for the read operations as meta-data blocks;

identifying the blocks that are not marked as meta-data blocks as data blocks; and migrating the data blocks to sequential storage, while leaving the meta-data blocks on the random access storage, wherein the data blocks form a backup image.

3. The computer program product of claim 2, wherein the computer readable program code, when executed by the processor of the backup server, is configured to perform:

receiving a list of the files that have changed from a file level filter.

4. The computer program product of claim 1, wherein the computer readable program code, when executed by the processor of the backup server, is configured to perform:

identifying at least one of a full image and an incremental image that is to be retained;

deleting the data blocks and the meta-data blocks that relate to the at least one of the full image and the incremental image; and re-creating the at least one of the full image and the incremental image for which the data blocks and the meta-data blocks were deleted.

5. The computer program product of claim 1, wherein the computer readable program code, when executed by the processor of the backup server, is configured to perform:

creating a new, synthetic full image for at least one of a full image and an incremental image that is to be retained from relevant data blocks and meta-data blocks.

6. The computer program product of claim 1, wherein the block level representation of the file system is presented to the operating system at the production server.

7. A backup server for block level backup, comprising:

a processor;

a storage device coupled to the processor;

a random access storage device coupled to the backup server;

a sequential storage device coupled to the backup server;

wherein the storage device has stored thereon a program, and wherein the processor is configured to execute instructions of the program to perform operations, wherein the operations comprise:

while performing file enumeration on a mounted image created from a full image that exposes a block level representation of a file system, marking blocks for read operations that reference meta-data blocks as the meta-data blocks, wherein the blocks that are not marked as the meta-data blocks are data blocks;

in response to the file enumeration completing, migrating the data blocks to the sequential storage device, while leaving the meta-data blocks on random access storage device, wherein the data blocks form a backup image; and in response to receiving a request to restore a file from the backup image for the production server, retrieving relevant meta-data blocks from the random access storage that indicate where the data blocks for the file are stored in the sequential storage;

creating a new, mounted image from the relevant meta-data blocks that exposes a block level representation of the file system for access by the operating system;

performing non-data related operations against the new, mounted image; and restoring the file by reading the data blocks for that file from the sequential storage to production storage at the production server.

8. The backup server of claim 7, wherein the operations further comprise:

monitoring file changes on the production storage device;

performing an incremental image level backup to the random access storage device;

creating a new, mounted image from the incremental image that exposes a block level representation of the file system for accesses of the read operations in the file level format;

performing file enumeration on the new, mounted image for files that have changed;

monitoring block level read operations while the files that have changed are being enumerated;

during monitoring, marking blocks that are read for the read operations as meta-data blocks;

identifying the blocks that are not marked as meta-data blocks as data blocks; and migrating the data blocks to sequential storage device, while leaving the meta-data blocks on the random access storage device, wherein the data blocks form a backup image.

9. The backup server of claim 8, wherein the operations further comprise:

receiving a list of the files that have changed from a file level filter.

10. The backup server of claim 7, wherein the operations further comprise:

identifying at least one of a full image and an incremental image that is to be retained;

deleting the data blocks and the meta-data blocks that relate to the at least one of the full image and the incremental image; and re-creating the at least one of the full image and the incremental image for which the data blocks and the meta-data blocks were deleted.

11. The backup server of claim 7, wherein the operations further comprise:

creating a new, synthetic full image for at least one of a full image and an incremental image that is to be retained from relevant data blocks and meta-data blocks.

12. The backup server of claim 7, wherein the block level representation of the file system is presented to the operating system at the production server.

* * * * *